United States Patent
Sugimoto et al.

(10) Patent No.: US 12,463,235 B2
(45) Date of Patent: Nov. 4, 2025

(54) CYLINDRICAL BATTERY

(71) Applicant: SANYO Electric Co., Ltd., Kadoma (JP)

(72) Inventors: Shuji Sugimoto, Hyogo (JP); Takahiro Fukuoka, Tokushima (JP); Kazuhiko Watanabe, Osaka (JP); Toshihiko Mori, Shiga (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 600 days.

(21) Appl. No.: 17/798,199

(22) PCT Filed: Feb. 2, 2021

(86) PCT No.: PCT/JP2021/003703
§ 371 (c)(1),
(2) Date: Aug. 8, 2022

(87) PCT Pub. No.: WO2021/166631
PCT Pub. Date: Aug. 26, 2021

(65) Prior Publication Data
US 2023/0090756 A1   Mar. 23, 2023

(30) Foreign Application Priority Data
Feb. 19, 2020  (JP) .................................. 2020-026265

(51) Int. Cl.
*H01M 50/107* (2021.01)
*H01M 10/04* (2006.01)
(Continued)

(52) U.S. Cl.
CPC ..... *H01M 10/0422* (2013.01); *H01M 50/107* (2021.01); *H01M 50/179* (2021.01);
(Continued)

(58) Field of Classification Search
CPC ........... H01M 10/0422; H01M 50/107; H01M 50/186; H01M 50/559; H01M 50/50
See application file for complete search history.

(56) References Cited

U.S. PATENT DOCUMENTS 9,356,263 B2    5/2016  Kim
2002/0136944 A1*  9/2002  Nemoto .............. H01M 50/559
                                                        429/94
(Continued)

FOREIGN PATENT DOCUMENTS

JP    10-340714 A    12/1998
JP    2007-184270 A   7/2007
(Continued)

OTHER PUBLICATIONS

Office Action dated Dec. 15, 2023, issued in counterpart CN application No. 202180012377.7, with English translation. (15 pages).

(Continued)

*Primary Examiner* — Kenneth J Douyette
(74) *Attorney, Agent, or Firm* — WHDA, LLP

(57) ABSTRACT

The cylindrical battery includes: an electrode body in which a positive electrode plate and a negative electrode plate are wound with a separator therebetween: an electrolyte; a bottomed cylindrical outer can that houses the electrode body and the electrolyte; and a sealing body that closes an opening of the outer can, wherein the sealing body includes a rupture plate that is caulked and fixed to the opening of the outer can with a gasket therebetween, and an external terminal that is not caulked and fixed to the opening of the outer can, the rupture plate has a valve part that is ruptured when an internal battery pressure rises, and the external terminal is fixed to an upper surface portion of a valve part.

10 Claims, 6 Drawing Sheets

(51) Int. Cl.
*H01M 50/179* (2021.01)
*H01M 50/186* (2021.01)
*H01M 50/342* (2021.01)
*H01M 50/46* (2021.01)
*H01M 50/559* (2021.01)
*H01M 50/562* (2021.01)

(52) U.S. Cl.
CPC ..... *H01M 50/186* (2021.01); *H01M 50/3425* (2021.01); *H01M 50/46* (2021.01); *H01M 50/559* (2021.01); *H01M 50/562* (2021.01)

(56) References Cited

U.S. PATENT DOCUMENTS

| | | |
|---|---|---|
| 2007/0154781 A1 | 7/2007 | Choi |
| 2012/0219849 A1 | 8/2012 | Kim |
| 2015/0024258 A1 | 1/2015 | Sumiyama et al. |
| 2017/0338463 A1 | 11/2017 | Sugaya et al. |
| 2018/0047973 A1 | 2/2018 | Kunoike et al. |
| 2020/0091482 A1 | 3/2020 | Min et al. |

FOREIGN PATENT DOCUMENTS

| | | |
|---|---|---|
| JP | 2015-125869 A | 7/2015 |
| WO | 2016/103656 A1 | 6/2016 |
| WO | 2016/157749 A1 | 10/2016 |
| WO | 2019/098592 A1 | 5/2019 |

OTHER PUBLICATIONS

Office Action dated Sep. 4, 2024, issued in counterpart CN Application No. 202180012377.7, with English translation. (10 pages).
Extended (Supplementary) European Search Report dated Jun. 24, 2024, issued in counterpart Application No. 21757333.6. (9 pages).
International Search Report dated Apr. 27, 2021, issued in counterpart International Application No. PCT/JP2021/003703 (2 pages).

* cited by examiner

CYLINDRICAL BATTERY

CROSS-REFERENCE TO RELATED APPLICATION

This application is a National Phase Application filed under 35 U.S.C. § 371 of International Application No. PCT/JP2021/003703 filed on Feb. 2, 2021 which claims the benefit of priority under 35 U.S.C. § 119 (a) of Japanese Patent Application No. 2020-026265 filed in Japan on Feb. 19, 2020, the contents of which are incorporated herein by reference.

TECHNICAL FIELD

The present disclosure generally relates to a cylindrical battery.

BACKGROUND ART

There has been conventionally known a cylindrical battery comprising a sealing assembly that seals an opening of an exterior housing can (for example, PATENT LITERATURE 1). In the sealing assembly of the above-described cylindrical battery, a rupture disk and a metal plate are stacked with an insulating plate interposed therebetween, and the rupture disk and the metal plate are joined to each other by welding to thereby form a current pathway inside the sealing assembly. In the sealing assembly, if an internal pressure of the battery increases in an abnormal case, the rupture disk is deformed, and the metal plate breaks, resulting in cutting off of the current pathway, and if the internal pressure further increases, the rupture disk ruptures, resulting in formation of a gas venting port.

Incidentally, the above-described cylindrical battery is used as, for example, a power supply of an electronic apparatus such as a cellular phone, a digital camera, a video camera, and a notebook type personal computer. In the case where cylindrical batteries are incorporated into an electronic apparatus, a lead plate is joined to each of a positive electrode external terminal and a negative electrode external terminal to connect the cylindrical batteries to one another. In recent years, the joining is performed by various joining methods such as wire bonding, laser welding, and resistance welding.

CITATION LIST

Patent Literature

PATENT LITERATURE 1: International Publication No. WO 2016/157749

SUMMARY

Technical Problem

In the above-described cylindrical battery, the rupture disk serves as a positive electrode external terminal, and therefore, depending on the joining method, heat or shock may be applied to a joining part between the rupture disk and the metal plate. At this time, the metal plate is detached from the rupture disk due to heat or shock during welding, which may lead to functional loss of the sealing assembly. In the case where a conventional terminal cap is applied to the above-described cylindrical battery, gas venting ability may be inhibited.

It is an advantage of the present disclosure to provide a cylindrical battery that can avoid functional loss of a sealing assembly when a lead plate is welded to a positive electrode external terminal and has a good gas venting function.

Solution to Problem

The cylindrical battery of an aspect of the present disclosure is a cylindrical battery comprising: an electrode assembly in which a positive electrode plate and a negative electrode plate are wound with a separator interposed between the positive electrode plate and the negative electrode plate; an electrolyte; a bottomed cylindrical exterior housing can that houses the electrode assembly and the electrolyte; and a sealing assembly that seals an opening of the exterior housing can, wherein the sealing assembly includes a rupture disk that is fixed by crimping to the opening of the exterior housing can with a gasket interposed between the exterior housing can and the rupture disk, and an external terminal that is not fixed by crimping to the opening of the exterior housing can, the rupture disk has a vent part that ruptures when an internal pressure of the battery increases, and the external terminal is fixed to an upper face part of the vent part.

Advantageous Effects of Invention

According to an aspect of the present disclosure, there can be provided a cylindrical battery that can avoid functional loss of a sealing assembly when a lead plate is welded to a positive electrode external terminal and has a good gas venting function.

DESCRIPTION OF EMBODIMENTS

Hereinafter, embodiments of the present disclosure will be described with reference to the drawings. The shapes, materials, and numbers described below are examples for explanation, and may be appropriately modified in accordance with specifications of cylindrical batteries. Hereinafter, explanation will be made with similar elements being represented by the same reference signs in all drawings.

Figure 1:
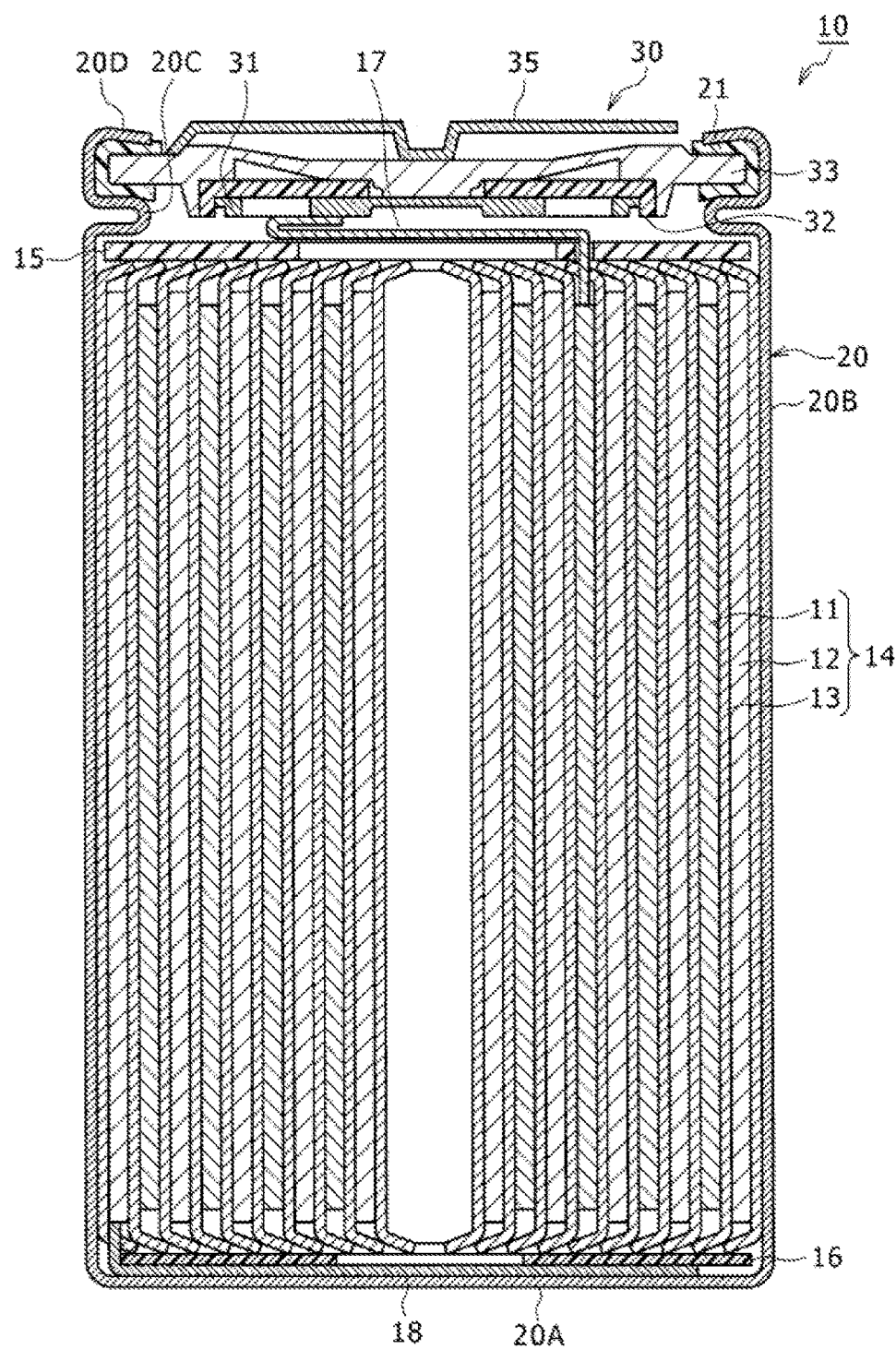
FIG. 1 is a sectional view of a cylindrical battery of an example of an embodiment.

A cylindrical battery 10 will be described with reference to FIG. 1. FIG. 1 is a sectional view of the cylindrical battery 10.

As illustrated in FIG. 1, the cylindrical battery 10 of an example of an embodiment comprises an electrode assembly 14, an electrolyte, an exterior housing can 20 that houses the electrode assembly 14 and the electrolyte, and a sealing assembly 30 that seals an opening of the exterior housing can 20. The electrode assembly 14 includes a positive electrode plate 11, a negative electrode plate 12, and a separator 13, and has a wound structure in which the positive electrode plate 11 and the negative electrode plate 12 are spirally wound with the separator 13 interposed therebetween. Hereinafter, for convenience of description, the sealing assembly 30 side (an opening side of the exterior housing can 20) of the cylindrical battery 10 will be described as "the upper side", and a bottom face part 20A side of the exterior housing can 20 will be described as "the lower side."

The positive electrode plate 11 has a positive electrode core, and a positive electrode mixture layer formed on at least one face of the core. For the positive electrode core, there can be used a foil of a metal such as aluminum or an aluminum alloy, which is stable in a potential range of the positive electrode plate 11, a film in which such a metal is provided on a surface layer thereof, and the like. The positive electrode mixture layer contains a positive electrode active material, a conductive agent such as acetylene black, and a binder such as polyvinylidene fluoride, and is preferably formed on each side of the positive electrode core. For the positive electrode active material, there is used, for example, a lithium-transition metal composite oxide. The positive electrode plate 11 can be manufactured by applying a positive electrode mixture slurry containing a positive electrode active material, a conductive agent, a binder, and the like on the positive electrode core, drying the resulting coating film, and then compressing it to form a positive electrode mixture layer on each side of the core.

The negative electrode plate 12 has a negative electrode core, and a negative electrode mixture layer formed on at least one face of the core. For the negative electrode core, there can be used a foil of a metal such as copper or a copper alloy, which is stable in a potential range of the negative electrode plate 12, a film in which such a metal is provided on a surface layer thereof, and the like. The negative electrode mixture layer contains a negative electrode active material and a binder such as styrene-butadiene rubber (SBR), and is preferably formed on each side of the negative electrode core. For the negative electrode active material, there is used, for example, graphite, or a silicon-containing compound. The negative electrode plate 12 can be manufactured by applying a negative electrode mixture slurry containing a negative electrode active material, a binder, and the like on the negative electrode core, drying the resulting coating film, and then rolling it to form a negative electrode mixture layer on each side of the core.

For the electrolyte, a non-aqueous electrolyte is used, for example. The non-aqueous electrolyte contains a non-aqueous solvent, and an electrolyte salt dissolved in the non-aqueous solvent. For the non-aqueous solvent, there can be used esters, ethers, nitriles, amides, a mixed solvent containing at least two of those mentioned above, and the like. The non-aqueous solvent may also contain a halogen substitute in which at least a part of hydrogen of these solvents is substituted with a halogen atom such as fluorine. Note that the non-aqueous electrolyte is not limited to a liquid electrolyte, but may be a solid electrolyte. For the electrolyte salt, there is used, for example, a lithium salt such as $LiPF_6$. The kind of the electrolyte is not limited to a particular kind of electrolyte, but may also be an aqueous electrolyte.

The cylindrical battery 10 has insulating plates 15 and 16 arranged on the upper and lower sides of the electrode assembly 14, respectively. In the example illustrated in FIG. 1, a positive electrode lead 17 connected to the positive electrode plate 11 extends to the sealing assembly 30 side through a through hole of the insulating plate 15, and a negative electrode lead 18 connected to the negative electrode plate 12 extends to the bottom face part 20A side of the exterior housing can 20 along the outside of the insulating plate 16. The positive electrode lead 17 is connected to a lower face of a metal plate 31, which is a bottom plate of the sealing assembly 30, by welding or the like, and a rupture disk 33 of the sealing assembly 30 electrically connected to the metal plate 31 serves as a positive electrode external terminal. The negative electrode lead 18 is connected, by welding or the like, to an inner face of the bottom face part 20A of the exterior housing can 20, and the exterior housing can 20 serves as a negative electrode external terminal.

As described above, the cylindrical battery 10 has the exterior housing can 20, and the sealing assembly 30 that seals the opening of the exterior housing can 20. The exterior housing can 20 is a bottomed cylindrical metallic container including the bottom face part 20A and a lateral face part 20B. The bottom face part 20A has a disk shape, and the lateral face part 20B is formed into a cylindrical shape along an outer peripheral edge of the bottom face part 20A. The sealing assembly 30 has the rupture disk 33 fixed by crimping to the opening of the exterior housing can 20 with the gasket 21 interposed between the exterior housing can 20 and the rupture disk 33.

More specifically, the rupture disk 33 is supported by a grooved part 20C of the exterior housing can 20, and is fixed by crimping by a shoulder part 20D of the exterior housing can 20. The grooved part 20C is formed into an annular shape along the circumferential direction of the exterior housing can 20 to have a part of its lateral face part 20B configured to project to the inside in the vicinity of the opening of the exterior housing can 20. The shoulder part 20D is formed into an annular shape along the circumferential direction of the exterior housing can 20 at the opening end.

Figure 2:
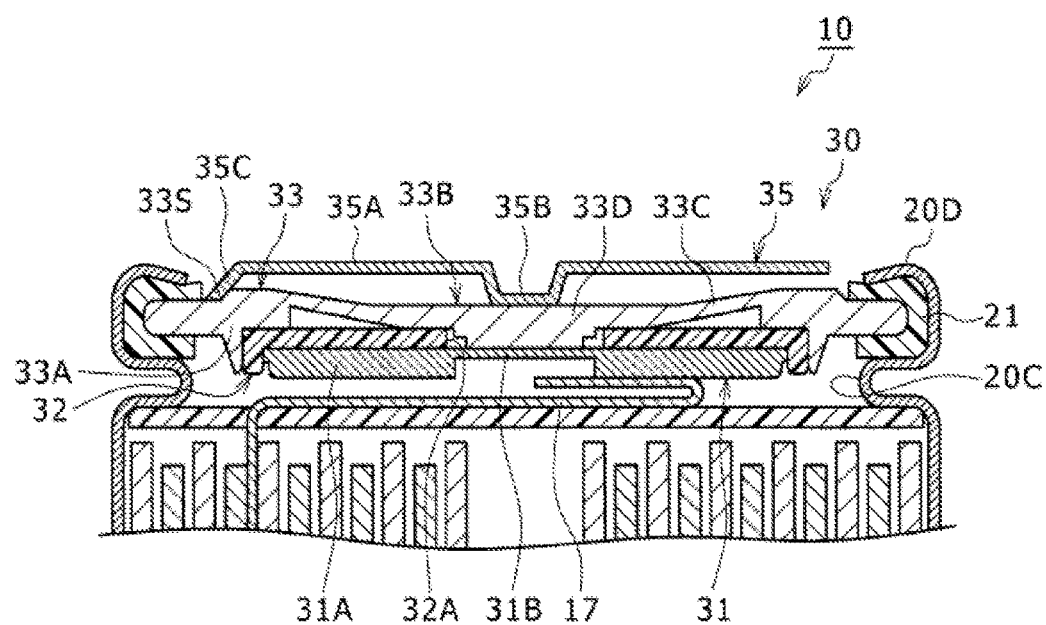
FIG. 2 is an enlarged view of a sealing assembly of an example of an embodiment and its vicinity.

The sealing assembly 30 will be described in detail with reference to FIGS. 1 and 2. FIG. 2 is an enlarged view of the sealing assembly 30 and its vicinity.

The sealing assembly 30 is a disk-shaped member that seals the opening of the exterior housing can 20 as described above, and functions as a current interrupt device and a safety valve. The sealing assembly 30 has a stacked structure of the metal plate 31, an insulating plate 32, the rupture disk 33, and the external terminal 35 in this order from the electrode assembly 14 side. In the rupture disk 33, there is formed a vent part 33B that ruptures when an internal pressure of the battery increases.

The metal plate 31 is a metal plate including an annular part 31A to which the positive electrode lead 17 is connected, and a thin central part 31B that is disconnected from the annular part 31A when an internal pressure of the battery exceeds a predetermined threshold. The insulating plate 32 is a plate for insulating a part other than a connecting part between the central part 31B of the metal plate 31 and the vent part 33B. In the insulating plate 32, an opening 32A is formed at a central part in the radial direction.

The rupture disk 33 is disposed to face the metal plate 31 with the insulating plate 32 interposed between the rupture disk 33 and the metal plate 31. The rupture disk 33 is formed into a circular shape in plan view, and is produced by pressing a plate material made of, for example, aluminum or an aluminum alloy. The rupture disk 33 has an outer peripheral part 33A that is supported by the grooved part 20C of the exterior housing can 20, and is fixed by crimping by the shoulder part 20D of the exterior housing can 20. A step part 33S is formed on the upper face part of the outer peripheral part 33A, and the vent part 33B is formed inside of the outer peripheral part 33A.

The vent part 33B functions as the safety valve that ruptures when the internal pressure of the battery increases and vents gas inside the battery. When viewed in a cross section in the radial direction, the vent part 33B includes a inclined part 33C that is inclined downward from the outside to the inside, and a central part 33D that has a projection projecting toward the inside of the battery. The inclined part 33C is interposed between the outer peripheral part 33A and the central part 33D, and a thickness of the inclined part 33C is smaller than each thickness of the outer peripheral part 33A and the central part 33D. The thickness of the inclined part 33C continuously decreases from the central part 33D side toward the outer peripheral part 33A side. Forming the inclined part 33C makes it easy to invert and rupture the vent part 33B when the internal pressure of the battery increases. The projection of the central part 33D is connected, by welding or the like, to the central part 31B of the metal plate 31 through the opening 32A of the insulating plate 32.

In the cylindrical battery 10, the metal plate 31 to which the positive electrode lead 17 is connected is electrically connected to the rupture disk 33, whereby there is formed a current pathway connecting from the electrode assembly 14 to the rupture disk 33. The cylindrical battery 10 activates the current interrupt device and the safety valve to secure the safety, in the case where the gas inside the battery rises as described above.

If the internal pressure of the cylindrical battery 10 increases, the metal plate 31 breaks, and the central part 31B is disconnected from the annular part 31A, whereby the vent part 33B is deformed to be inverted. Thus, the current pathway is cut off. If the internal pressure of the battery further increases, the vent part 33B ruptures as described above, resulting in formation of a gas venting port.

The external terminal 35 is a positive electrode external terminal for connecting cylindrical batteries 10 in series or parallel when the cylindrical batteries 10 are incorporated into an electronic apparatus, for example. The external terminal 35 is provided on the upper face part of the rupture disk 33 on the inside of the opening end (a portion corresponding to an inner peripheral end of the shoulder part 20D) of the exterior housing can 20. The external terminal 35 is fixed to the upper face part of the vent part 33B formed in the rupture disk 33. The external terminal 35 is not fixed by crimping to the opening of the exterior housing can 20. This can prevent the gas venting port formed in the vent part 33B from being sealed by the external terminal 35 and can secure a good gas venting function of the cylindrical battery 10.

The external terminal 35 is made of metal, and is formed by metal principally containing aluminum or iron, for example. The external terminal 35 of the present embodiment is produced by pressing a metal plate and is formed into a substantial disk shape. The external terminal 35 includes a disk-shaped main body 35A, a recess 35B formed at a substantially central part of the main body 35A, and a leg part 35C formed in the outer peripheral edge of the main body 35A.

The main body 35A is a part in which the above-described lead plate is welded. The main body 35A is formed into a flat circular-plate shape. Forming the main body 35A to be flat makes it possible to have as large a welding area as possible and can facilitate a welding operation when the lead plate is welded to the external terminal 35.

A position in an up-down direction of the main body 35A can be changed by changing a height of the recess 35B and a height of the leg part 35C. This can change the height of the main body 35A according to a space for incorporating the cylindrical batteries 10 into the electronic apparatus or a position of a lead plate for joining the cylindrical batteries 10 in the electronic apparatus, for example. An upper end position of the main body 35A of the present embodiment is preferably a position above an upper end position of the shoulder part 20D of the exterior housing can 20. Note that in the case where the lead plate is welded to the upper end position of the shoulder part 20D, the upper end position of the main body 35A may be disposed on the same plane as the upper end position of the shoulder part 20D.

The main body 35A is disposed with a gap provided between the main body 35A and the rupture disk 33. This makes the joining part between the rupture disk 33 and the metal plate 31 less likely to be affected by vibration or heat when the above-described lead plate is joined to the external terminal 35. For example, even in the case where the joining is performed by wire bonding or laser welding accompanied by high-frequency vibrations, there can be avoided functional loss of the sealing assembly 30 such that the metal plate 31 is detached from the vent part 33B.

The recess 35B is formed at the substantially central part of the main body 35A. In the external terminal 35 of the present embodiment, the bottom face part of the recess 35B is joined to the vent part 33B by laser welding. The load of the laser can be optimized by adjusting the thickness of the bottom face part of the recess 35B.

The leg part 35C is formed by bending downward an outer peripheral edge or a part of the outer peripheral edge of the external terminal 35. In the present embodiment, the leg part 35C is formed by being bent in an obliquely downward direction, but may be formed by being bent in a vertically downward direction. The leg part 35C of the present embodiment is formed into a projection shape at an arbitrary position in the outer peripheral edge of the main body 35A in plan view, but may be formed in a half-circumference or full circumference of the main body 35A in plan view.

The leg part 35C can support the main body 35A with respect to the rupture disk 33 by engaging with the step part 33S formed in an outer peripheral part 33A of the rupture disk 33. This enables the external terminal 35 to be easily positioned when the external terminal 35 is welded to the rupture disk 33.

As described above, the cylindrical battery 10 can avoid functional loss of the sealing assembly 30 when the lead plate is welded to the positive electrode side and can secure a good gas venting function.

Figure 3:
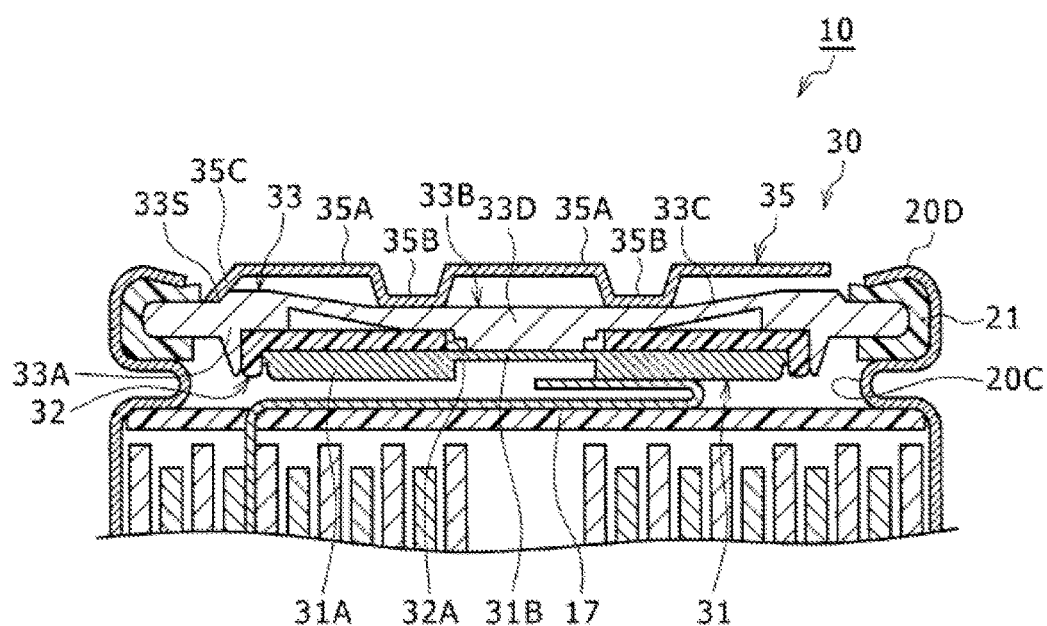
FIG. 3 is an enlarged view of a sealing assembly of a cylindrical battery of another example of an embodiment and its vicinity.

An external terminal 35 of another example of an embodiment will be described in detail with reference to FIG. 3. FIG. 3 is an enlarged view of a sealing assembly 30 and its vicinity.

The external terminal 35 of another example of an embodiment includes a disk-shaped main body 35A, an annular recess 35B formed at a substantially central part of the main body 35A, and a leg part 35C supporting the main body 35A with respect to a rupture disk 33. In the external terminal 35 of the present embodiment, the above-described lead plate is welded to the main body 35A surrounded by the annular recess 35B. The external terminal 35 has the same configuration as that of the external terminal 35 illustrated in FIG. 2 except for the above-described configuration.

According to the external terminal 35 of the present embodiment, an area of the bottom face part of the recess 35B can be increased by forming the recess 35B into an annular shape. This makes it possible to have a plurality of weld portions in the case where the bottom face part of the recess 35B and the vent part 33B are welded by spot welding, for example.

Figure 4:
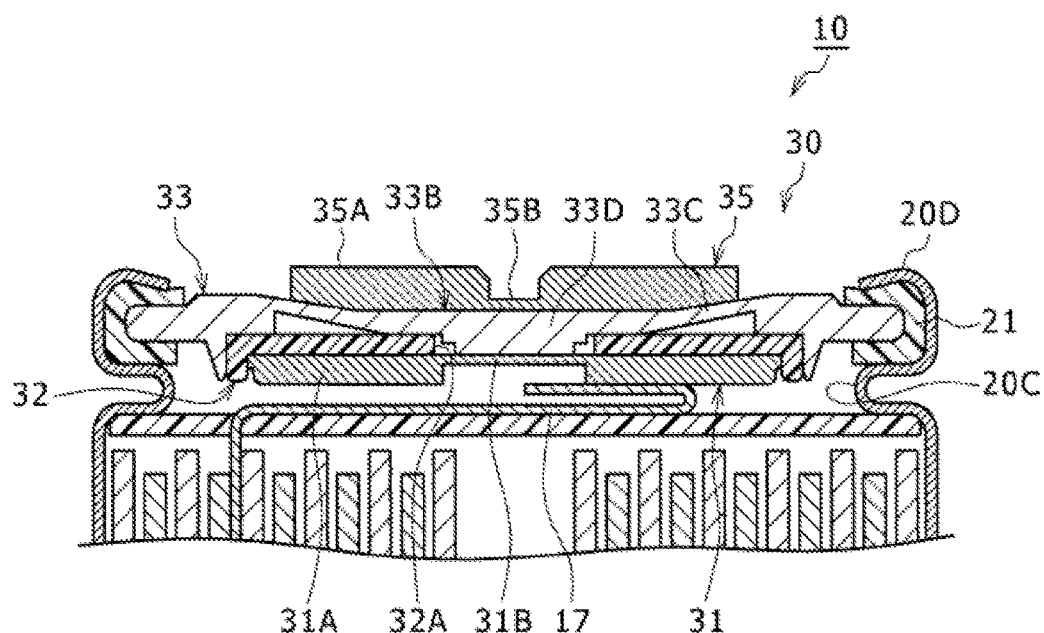
FIG. 4 is an enlarged view of a sealing assembly of a cylindrical battery of another example of an embodiment and its vicinity.

An external terminal 35 of another example of an embodiment will be described in detail with reference to FIG. 4. FIG. 4 is an enlarged view of a sealing assembly 30 and its vicinity.

The external terminal 35 of another example of an embodiment includes a disk-shaped main body 35A having a predetermined thickness, and a recess 35B formed at a substantially central part of the main body 35A. The main body 35A has a predetermined thickness. A bottom face part of the main body 35A is formed along an upper face part of a rupture disk 33. An upper face part of the main body 35A is formed to be flat.

According to the external terminal 35 of the present embodiment, the main body 35A has the predetermined thickness, which makes it possible to withstand a welding load even when it is necessary to increase the welding load such as an output from a laser, for example, when the lead plate is welded to the external terminal 35. In the joint between the external terminal 35 and the vent part 33B, the recess 35B formed to be thinner than the thickness of the main body 35A is joined to the vent part 33B by laser welding, which makes it possible to reduce the laser welding load.

Figure 5:
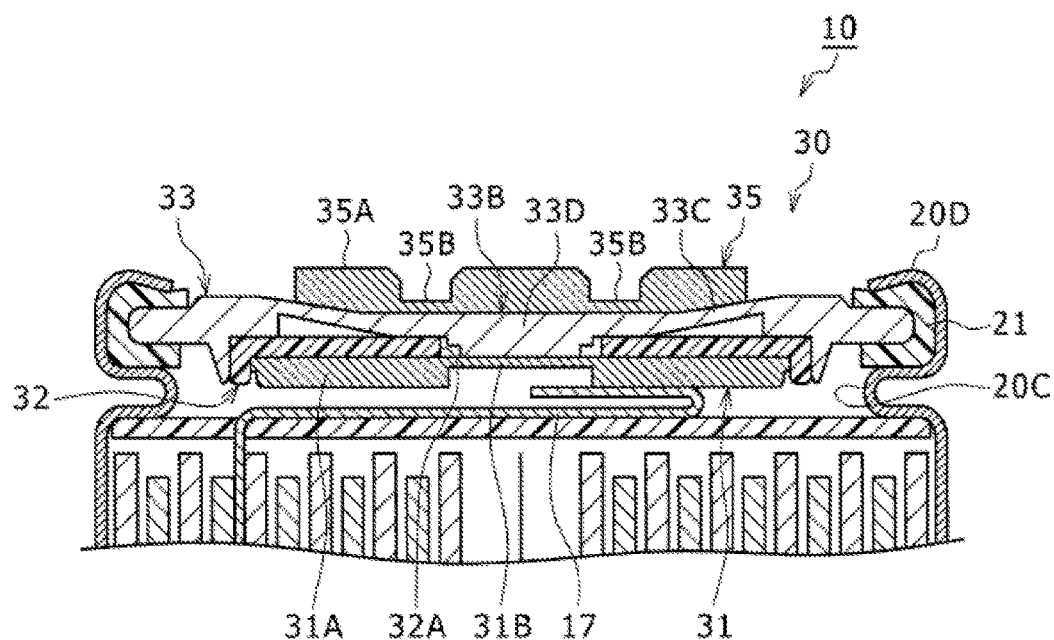
FIG. 5 is an enlarged view of a sealing assembly of a cylindrical battery of another example of an embodiment and its vicinity.

An external terminal 35 of another example of an embodiment will be described in detail with reference to FIG. 5. FIG. 5 is an enlarged view of a sealing assembly 30 and its vicinity.

The external terminal 35 of another example of an embodiment includes a disk-shaped main body 35A, and an annular recess 35B formed at a substantially central part of the main body 35A. In the external terminal 35, the above-described lead plate is welded to the main body 35A surrounded by the annular recess 35B. The external terminal 35 has the same configuration as that of the external terminal 35 illustrated in FIG. 4 except for the above-described configuration, and achieves the same effect as the external terminal 35 illustrated in FIG. 4. Similar to the external terminal 35 illustrated in FIG. 3, an area of the bottom face part of the recess 35B used for welding to the vent part 33B can be increased by forming the recess 35B into an annular shape.

Figure 6:
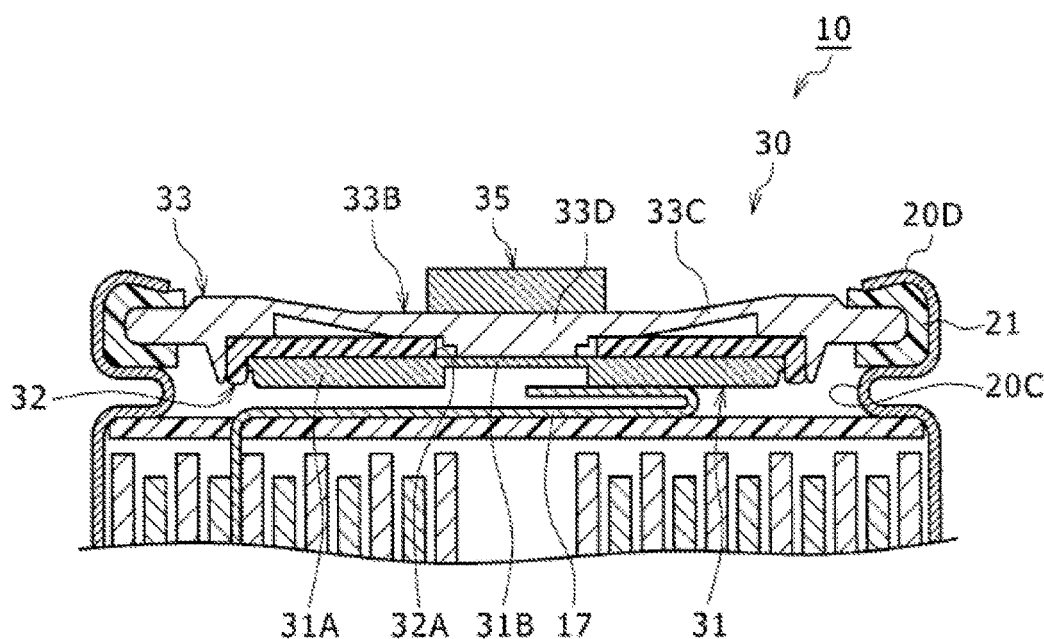
FIG. 6 is an enlarged view of a sealing assembly of a cylindrical battery of another example of an embodiment and its vicinity.

An external terminal 35 of another example of an embodiment will be described in detail with reference to FIG. 6. FIG. 6 is an enlarged view of a sealing assembly 30 and its vicinity.

The external terminal 35 of another example of an embodiment is formed into only a disk shape having a predetermined thickness. The external terminal 35 is joined to an upper face of a central part 33D of a vent part 33B. A radial size of the external terminal 35 is smaller than that of the central part 33D of the vent part 33B. According to the external terminal 35 of the present embodiment, the external terminal 35 is formed into only a disk shape having the predetermined thickness, which makes it possible to reduce the processing cost.

Note that the present invention is not limited to the above embodiment and modified example, and various changes and improvements are possible within the matters described in the claims of the present application.

REFERENCE SIGNS LIST

10 Cylindrical battery, 11 Positive electrode plate, 12 Negative electrode plate, 13 Separator, 14 Electrode assembly, 15 Insulating plate, 16 Insulating plate, 17 Positive electrode lead, 18 Negative electrode lead, 20 Exterior housing can, 20A Bottom face part, 20B Lateral face part, 20C Grooved part, 20D Shoulder part, 21 Gasket, 30 Sealing assembly, 31 Metal plate, 31A Annular part, 31B Central part, 32 Insulating plate, 32A Opening. 33 Rupture disk, 33A Outer peripheral part, 33B Vent part, 33C Inclined part, 33D Central part, 33S Step part, 35 External terminal, 35A Main body, 35B Recess, 35C Leg part

The invention claimed is:

1. A cylindrical battery, comprising:
an electrode assembly in which a positive electrode plate and a negative electrode plate are wound with a separator interposed between the positive electrode plate and the negative electrode plate;
an electrolyte;
a bottomed cylindrical exterior housing can that houses the electrode assembly and the electrolyte; and
a sealing assembly that seals an opening of the exterior housing can,
wherein the sealing assembly includes a rupture disk that is fixed by crimping to the opening of the exterior housing can with a gasket interposed between the exterior housing can and the rupture disk, and an external terminal that is not fixed by crimping to the opening of the exterior housing can,
the rupture disk has a vent part that ruptures when an internal pressure of the battery increases,
the external terminal is fixed to an upper face part of the vent part, and
the external terminal has a recess which is a recessed upper face part at a substantially central part, and in the recess, the external terminal and the vent part are welded to each other.

2. The cylindrical battery according to claim 1, wherein the external terminal includes a main body formed into a plate shape and disposed with a gap provided between the main body and the rupture disk, and a leg part supporting the main body with respect to the rupture disk.

3. The cylindrical battery according to claim 1, wherein an upper face part of the rupture disk is formed to be inclined toward a central part in a radial direction, and a bottom face part of the external terminal facing an upper face part of the rupture disk is formed along a shape of the upper face part of the rupture disk.

4. The cylindrical battery according to claim 1, wherein the recess is formed into an annular shape in plan view.

5. The cylindrical battery according to claim 1, wherein the external terminal is formed by metal containing aluminum or iron.

6. The cylindrical battery according to claim 2, wherein the recess is formed into an annular shape in plan view.

7. The cylindrical battery according to claim 3, wherein the recess is formed into an annular shape in plan view.

8. The cylindrical battery according to claim 2, wherein the external terminal is formed by metal containing aluminum or iron.

9. The cylindrical battery according to claim 3, wherein the external terminal is formed by metal containing aluminum or iron.

10. The cylindrical battery according to claim 4, wherein the external terminal is formed by metal containing aluminum or iron.

* * * * *